United States Patent [19]

Mon

[11] Patent Number: 4,979,653
[45] Date of Patent: Dec. 25, 1990

[54] CLOSURE CAP HAVING STRUCTURE FOR MINIMIZING DRIPPING

[75] Inventor: Thomas Mon, Union, N.J.

[73] Assignee: Nanlee F. Mon, Vauxhall, N.J. ; a part interest

[21] Appl. No.: 385,579

[22] Filed: Jul. 27, 1989

[51] Int. Cl.⁵ ............................................. G01F 11/28
[52] U.S. Cl. ................................. 222/453; 222/465.1; 222/476; 222/525
[58] Field of Search .................... 222/519–525, 222/365, 453, 465.1, 476, 451, 450, 212, 213, 108, 571

[56]  References Cited

U.S. PATENT DOCUMENTS

| 2,307,223 | 1/1943 | Kerr | 222/453 X |
| 2,820,579 | 1/1958 | Roth | 222/453 X |
| 2,834,520 | 5/1958 | Nyden | 222/525 |
| 2,936,935 | 5/1960 | Rabb | 222/525 |
| 2,950,032 | 8/1960 | Willis et al. | 222/465.1 |
| 3,081,921 | 3/1963 | Di Pierro et al. | 222/525 |
| 3,244,332 | 4/1966 | Rogers | 222/522 X |
| 4,020,981 | 5/1977 | Nixdorff | 222/525 |
| 4,679,714 | 7/1987 | Blake | 222/453 X |

Primary Examiner—Kevin P. Shaver
Attorney, Agent, or Firm—Evelyn M. Sommer

[57] ABSTRACT

A closure cap for a fluid container has a mounting part mounted on the container neck with a closure element of a given diameter fixedly positioned on the center axis thereof, and a movable part covering the container opening and movable along the center axis relative to the mounting part. The movable part has walls defining an external orifice on the center axis and an internal orifice recessed a distance inwardly from the external orifice. In one embodiment, the closure element is pulled to the closed position, and pushed to the opened position, and has a shape defining a labyrinth that creates a suction force which prevents fluid from leaking from the container when the container is righted.

5 Claims, 3 Drawing Sheets

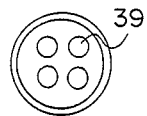
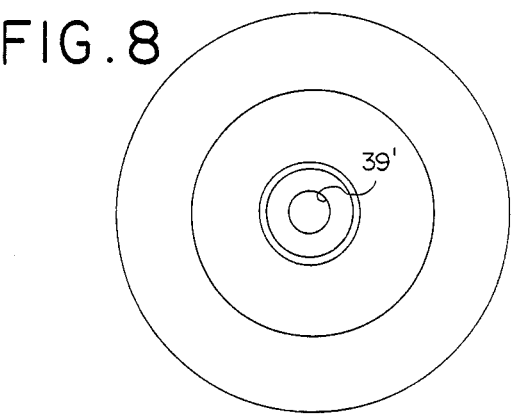
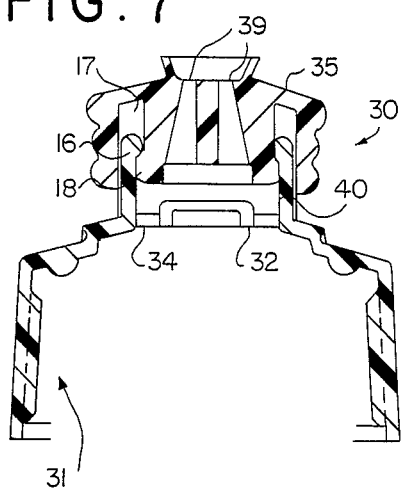
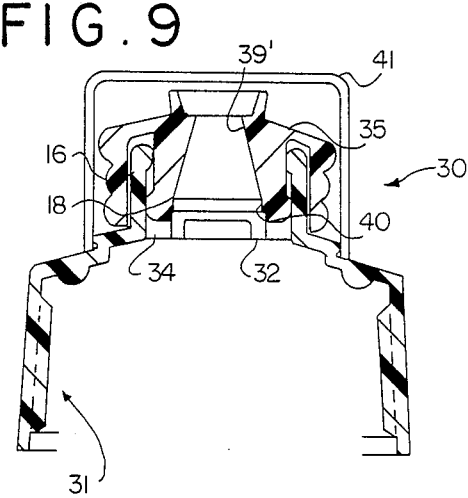
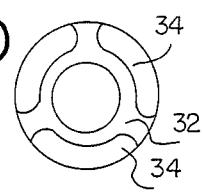

CLOSURE CAP HAVING STRUCTURE FOR MINIMIZING DRIPPING

FIELD OF THE INVENTION

This invention generally relates to a closure cap, and more particularly, to a closure cap for a container having a structure which minimizes dripping as fluid is dispensed from the container or when the cap is closed. The cap of the invention is further characterized in that it is child resistant and is adapted for dispensing measured amounts of the fluid provided in the container.

BACKGROUND ART

The field of closure caps for fluid containers has been well developed. For squeezable plastic containers designed for convenient dispensing of fluids, such as soap, cleaners, solvents, seasonings, etc., it has been well known to provide closure caps of the type which are attached to the neck of the container and have a closure element which is pulled to open an orifice through which fluid is dispensed in a pressurized stream.

However, conventional closure caps have the problem that, when the container is inverted and squeezed, fluid will often leak or drip from the orifice in between squeezes. The leaked fluid will soil the external part of the cap or drip down the side of the container when restored to the upright position, thereby making the container and the closure element messy to handle. Also, when the closure element is pushed to close the orifice, residual fluid in the area of the orifice will be pushed or ooze out onto the external surface of the closure element.

Therefore, it is a principal object of the invention to provide a closure cap for a container having a structure which minimizes dripping when fluid is dispensed from the container or when the cap is closed. It is a specific object to provide a closure cap of the pull/push or rotary open/close type which does not leak fluid while dispensing fluid and does not push residual liquid out when the cap is closed.

SUMMARY OF THE INVENTION

In accordance with the invention, a closure cap for a container containing fluid to be dispensed through an opening in a neck portion thereof comprises a mounting part mounted on the neck portion of the container having a closure element of a given diameter fixedly positioned on a center axis of the neck portion, and a movable part covering the container opening and being movable along the center axis relative to the mounting part, said movable part having walls defining an external orifice on the center axis and an internal orifice recessed a distance inwardly from the external orifice, said internal orifice being closed by the closure element when the movable part is moved to one position on the center axis and being opened when it is moved to another position on the center axis, wherein the distance the internal orifice is recessed, the diameter of the closure element, and the opened and closed positions of the movable part are selected such that fluid is not leaked or dripped from the container while dispensing fluid or when the movable part is moved to the closed position.

In one embodiment, the closure element is positioned on the end of a stem fixed to the mounting part, and the movable part is arranged such that the closure element blocks the internal orifice when the movable part is pulled outwardly to the closed position and opens the internal orifice when pushed inwardly to the opened position. The closure element has an inverted cone shape which creates a labyrinth around which fluid flows when the movable part is in the opened position. The labyrinth creates a suction force which prevents fluid from leaking from the container when the container is turned back to the upright position after dispensing fluid. The pull-to-close arrangement of the closure element and the internal orifice ensures that fluid is not pushed out when the movable part is moved to the closed position. Another version has an external orifice which is eccentrically offset from the internal orifice in the direction the fluid is dispensed.

In another embodiment, the closure element is positioned within the container, and the external orifice has a smaller cross-sectional area than the internal orifice. The smaller cross-sectional area creates a suction force which prevents fluid from leaking from the container in between squeezes while dispensing. The internal location of the closure element and recessed distance from the external orifice allows the movable part to use the conventional push-to-close action without having any fluid pushed out while closing.

Other objects, features, and advantages of the present invention will become apparent from the following detailed description of the best mode of practicing the invention when considered in conjunction with the drawings, as follows:

DESCRIPTION OF THE DRAWINGS

FIG. 6 is a top view of the cap shown in FIG. 7;

FIG. 7 is a side sectional view of a further embodiment of the closure cap of the invention in the opened position;

FIG. 8 is a top view of the cap of FIG. 7 shown in FIG. 9;

FIG. 9 is a side sectional view of the cap of FIG. 7 in the closed position; and FIG. 10 is a bottom view of the cap shown in FIG. 9.

DESCRIPTION OF THE PREFERRED EMBODIMENTS

Figure 1:
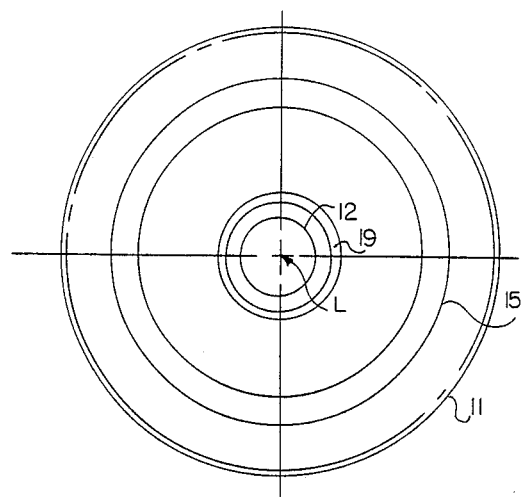
FIG. 1 is a top view of the closure cap shown in FIG. 2.
Figure 2:
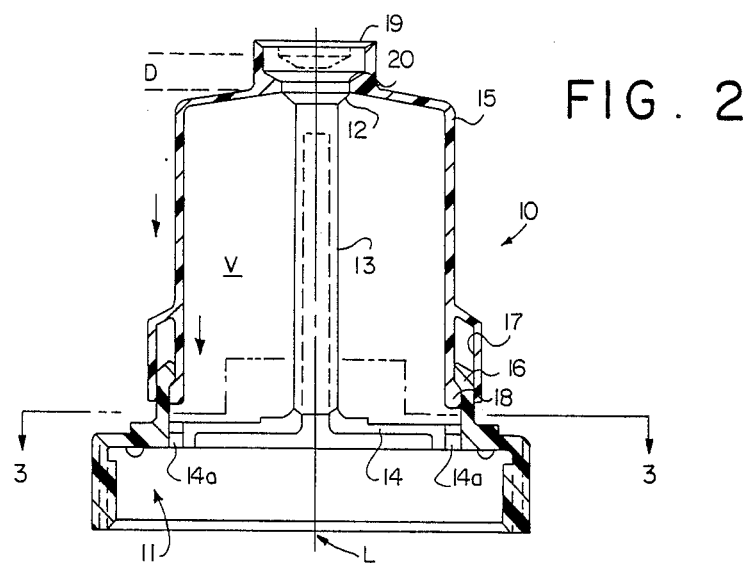
FIG. 2 is a side sectional view of a closure cap in accordance with the invention.
Figure 3:
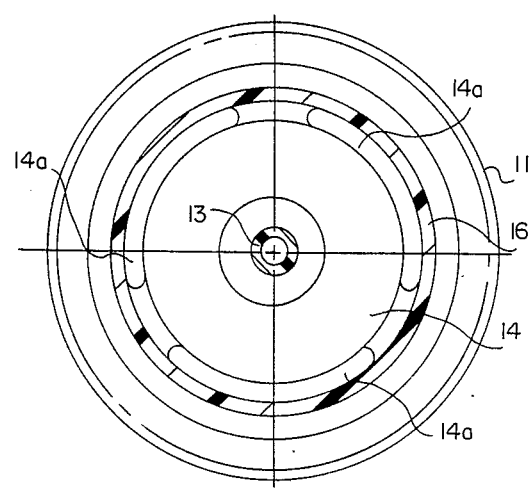
FIG. 3 is a bottom view of the cap shown in FIG. 2 taken along view lines A—A.

In the invention, a closure cap 10 is provided for a container containing fluid to be dispensed through an opening in a neck portion thereof. Referring to FIGS. 1–3, one embodiment of a closure cap 10 includes a mounting part 11 which is mounted on the neck portion of the container and has a closure element 12 of a given diameter fixedly positioned on a center axis L of the neck portion. The closure element 12 is mounted on one end of a stem 13 which is mounted at its other end to a plate 14 fixed to the mounting part 11.

The closure cap 10 has a movable part 15 covering the container opening which is movable along the center axis L between opened and closed positions. Retention of the movable part is obtained by a collar 16 of the mounting part 11 which is slidable in an annular slot 17 formed in the movable part 15 and abuts with a bead at the end of travel. Alternatively, the movable part 15 may also be displaced by a rotary action using interengaging threaded parts. The movable part 15 has an internal volume V corresponding to an amount of fluid to be dispensed. The plate 14 has a number of slots 14a through which fluid from the container flows into the volume V when the movable part is in the closed position, as shown in FIG. 2, and the container is inverted.

The movable part 15 has walls at its upper end defining an external orifice 19 and an internal orifice 20 positioned on the center axis. The internal orifice 20 is recessed a distance D inwardly from the external orifice 19. The closure element 12 has a diameter corresponding to the diameter of the internal orifice 20. The internal orifice 20 becomes closed by the closure element 12 when the movable part 15 is pulled to the closed position in a direction away from the mounting part 11, as shown in solid lines in FIG. 2. The internal orifice 20 becomes opened when the movable part 15 is pushed to the opened position toward the mounting part 11, whereupon the fluid in the volume V is dispensed in the measured amount. The slots 14a are sealed off from the container by the bead 18 of the movable part 15 in the opened position.

The closure element 12 has an inverted cone shape which creates a labyrinth, in conjunction with the diameter of the external orifice, the distance D, and the diameter of the stem 13, through which the fluid flows when the movable part 15 is pushed to the opened position. The labyrinth creates a suction force which prevents fluid from leaking from the container when the container is turned back to the upright position. Any residual fluid in the volume V is sucked back into the container. The pull-to-close arrangement of the closure element 12 and internal orifice 20 and the recessed distance D from the external orifice ensures that fluid is not pushed out when the movable part 15 is pulled to the closed position.

Figure 4:
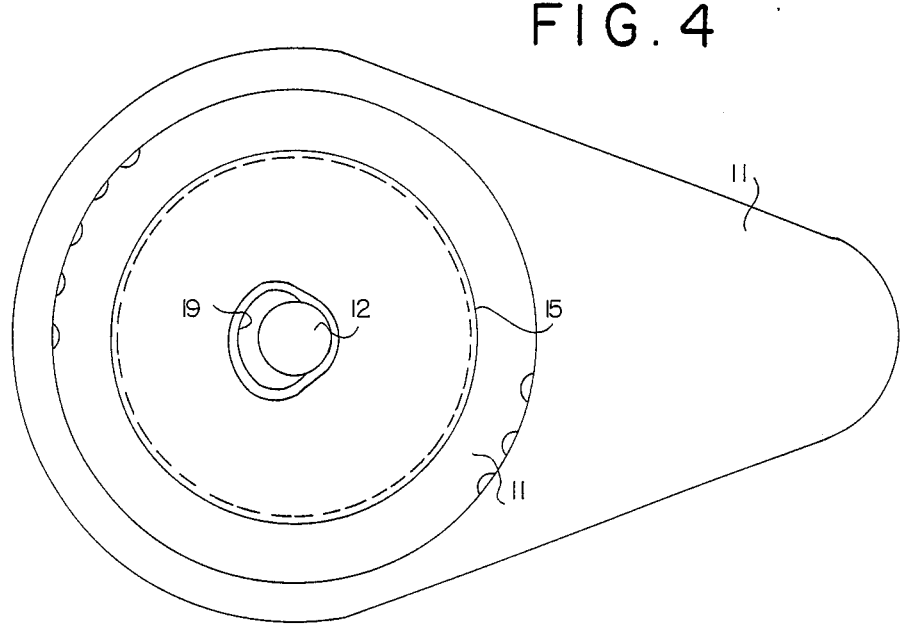
FIG. 4 is a top view of the cap shown in FIG. 5.
Figure 5:
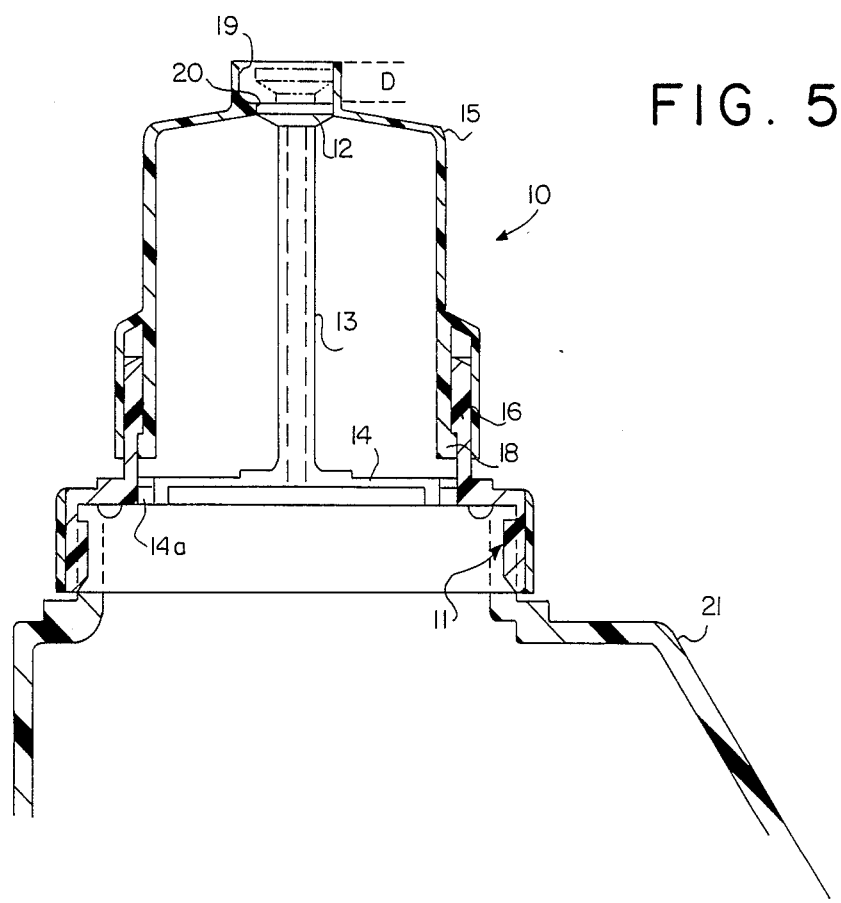
FIG. 5 is a side sectional view of another embodiment of the closure cap of the invention.

Another version of the pull-to-close closure cap is shown in FIGS. 4-5 having similar parts as in the above-described version. This version differs in that the container has a handle 21 on one side which is held when fluid is to be dispensed from the container in the direction opposite from the handle, and the external orifice 19 is eccentrically offset from the internal orifice 20 so as to define an opening in the direction the fluid is dispensed.

In a further embodiment of the closure cap 30 shown in FIGS. 6-10, the movable part 35 has an external orifice in the form of small openings 39 and a wider internal orifice 40. The closure element 32 of the mounting part 31 is positioned within the container. FIG. 7 shows the movable part 35 pulled to the opened position, and FIG. 9 shows it pushed to the closed position. FIG. 9 shows a version in which the external orifice is formed simply as a constricted opening 39'. In the closed position, the bead 18 of the movable part closes off slots 34 from the container. In the opened position, the smaller cross-sectional area of the external orifice 39, 39' creates a suction force which prevents fluid from leaking from the container in between squeezes while dispensing. The internal location of the closure element and recessed distance from the external orifice allows the movable part to use the conventional push-to-close action without having any fluid pushed out while closing. A cover 41 may also be provided for covering the closure cap when it is not in use.

Numerous modifications of the closure cap are of course possible in light of the above-disclosed principles of the invention. It will be appreciated that all such modifications and variations are nevertheless considered to be within the spirit and scope of the invention as defined in the claims appended hereto.

I claim:

1. A closure cap, for a container containing fluid to be dispensed through an opening in a neck portion thereof when the container is inverted from an upright position, comprising:

a mounting part mounted on the neck portion of the container having apertures which communicate with the container interior and a closure element fixedly positioned on the mounting part on a center axis of the neck portion;

a movable part reciprocally mounted on the mounting part and being movable along the center axis relative to the mounting part, said movable part having walls defining an external orifice of one diameter on the center axis and an internal orifice of a smaller diameter on the center axis which is recessed a given distance inwardly from the external orifice, said internal orifice being closed by said closure element when said movable part is moved to a closed position on the center axis and being opened when it is moved to an opened position on the center axis, wherein said closure element external closure equal in diameter to said one diameter of said external orifice and an internal closure equal in diameter to said smaller diameter of said internal orifice.

2. A closure cap according to claim 1, wherein said closure element is positioned on the end of a stem fixed to said mounting part, and the closure element blocks the internal orifice when the movable part is pulled to the closed position away from said mounting part and opens the internal orifice when pushed to the opened position toward said mounting part.

3. A closure cap according to claim 2, wherein said movable part further comprises walls defining a given volume of space inwardly of said internal orifice and having blocking portions at an internal end thereof, and said mounting part comprises internal walls across the neck opening mounting said stem on which said closure element is supported on a distal end thereof, said internal walls having said apertures therein for entry of fluid therein when the container is inverted and said movable part is in the closed position, and said internal wall aperture being closed by said blocking portions of said movable part when said movable part is pushed to the opened position toward said mounting part in order to allow dispensing of fluid from said given volume from the container.

4. A closure cap in combination with a container containing fluid to be dispensed through an opening in a neck portion thereof when the container is inverted from an upright position, comprising:

a mounting part mounted on the neck portion of the container having apertures which communicate with the container interior and a closure element fixedly positioned on the mounting part on an axis of the neck portion;

a movable part reciprocally mounted on the mounting part and being movable along the neck axis relative to the mounting part, said movable part having walls defining an external orifice of an eccentric shape relative to the neck axis and an internal orifice of a given diameter on the neck axis which is recessed a given distance inwardly from the external orifice, said internal orifice being closed by said closure element when said movable part is moved to a closed position on the neck axis and being opened when it is moved to an opened position on the neck axis, wherein said closure element comprises an external closure equal in cross-sectional shape to the shape of the external orifice and an internal closure equal in diameter to the given diameter of said internal orifice, and said container further having a handle on one side thereof, and said external orifice being eccentrically offset from the neck axis toward a side opposite from said handle in order to facilitate dispensing of fluid from the container.

5. A closure cap according to claim 4, wherein said closure element is positioned on the end of a stem fixed to said mounting part, and said closure element blocks the internal orifice when the movable part is pulled to the closed position away from said mounting part and opens the internal orifice when pushed to the opened position toward said mounting part, wherein said movable part further comprises walls defining a given volume of space inwardly of said internal orifice and having blocking portions at an internal end thereof, and wherein said mounting part comprises internal walls across the neck opening mounting a stem on which said closure element is supported on a distal end thereof, said internal walls having said apertures therein for entry of fluid therein when the container is inverted and said movable part is in the closed position, and said internal wall apertures being closed by said blocking portions of said movable part when said movable part is pushed to the opened position toward said mounting part in order to allow dispensing of fluid from said given volume from the container.

* * * * *